Figure 1:
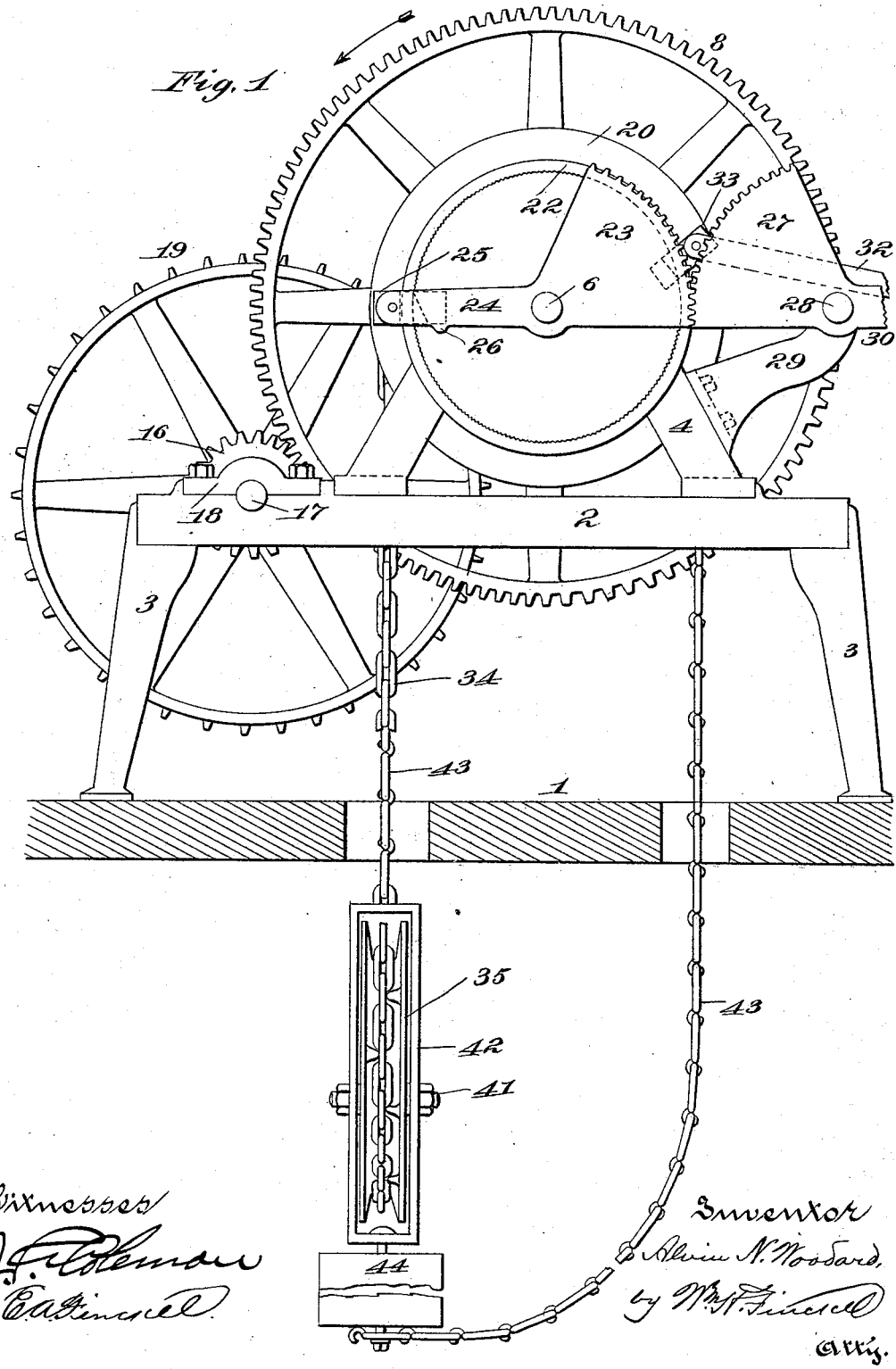

(No Model.) 3 Sheets—Sheet 1.
A. N. WOODARD.
MECHANICAL MOVEMENT.

No. 539,847. Patented May 28, 1895.

(No Model.) 3 Sheets—Sheet 2.
A. N. WOODARD.
MECHANICAL MOVEMENT.
No. 539,847. Patented May 28, 1895.
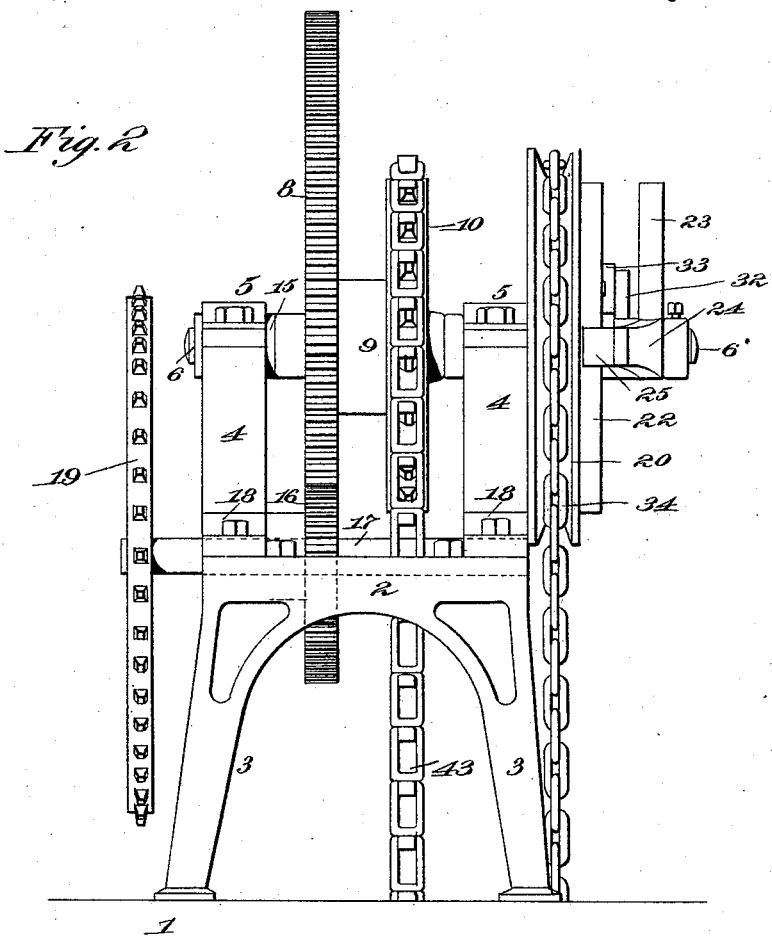
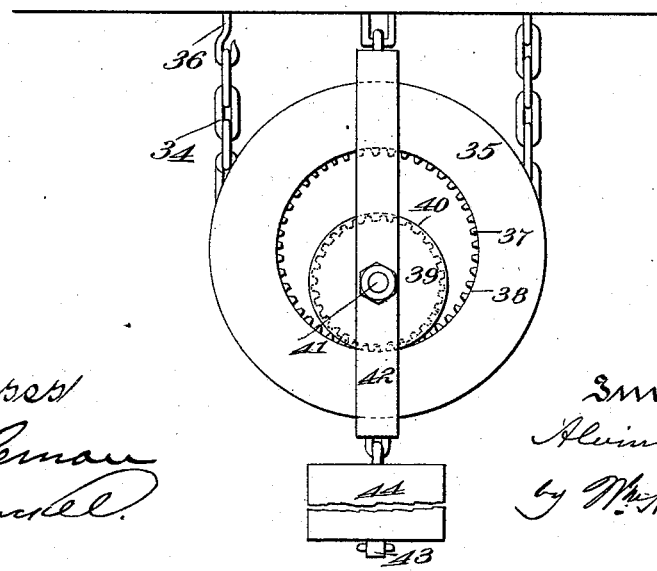

(No Model.) 3 Sheets—Sheet 3.
A. N. WOODARD.
MECHANICAL MOVEMENT.
No. 539,847. Patented May 28, 1895.
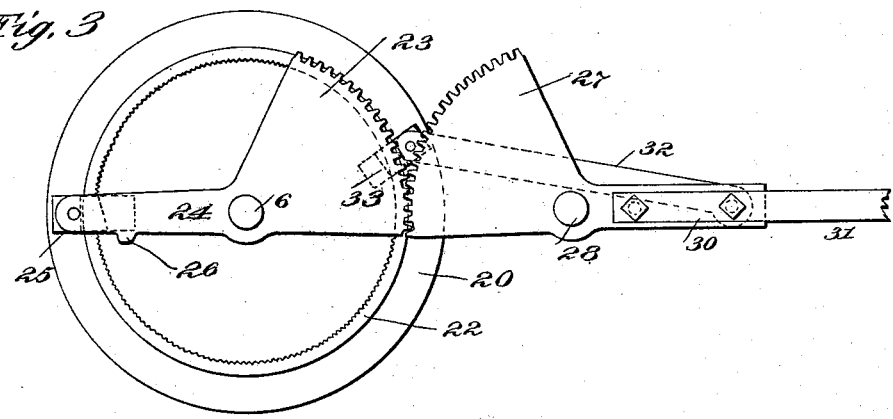
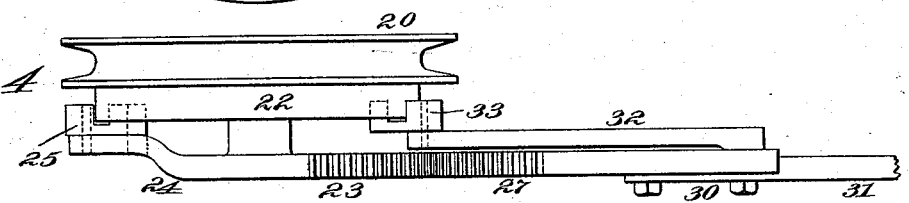
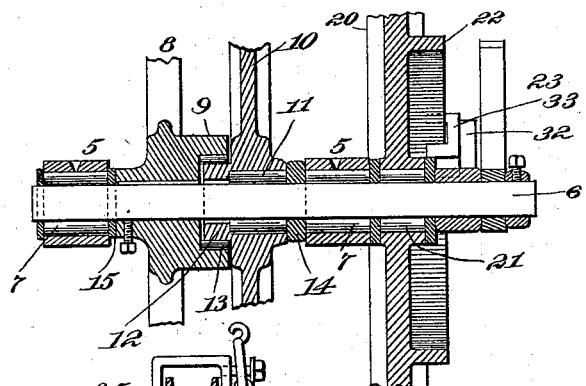
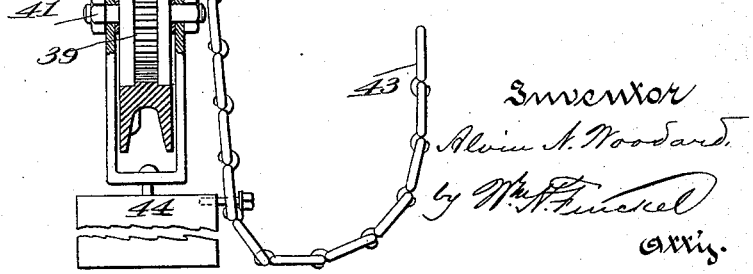
Witnesses
J. F. Coleman
E. A. Finckel
Inventor
Alvin N. Woodard
by Wm. F. Finckel
Atty.
THE NORRIS PETERS CO., PHOTO-LITHO., WASHINGTON, D. C.

UNITED STATES PATENT OFFICE.

ALVIN N. WOODARD, OF MANSFIELD, OHIO, ASSIGNOR OF ONE-HALF TO VENIAH C. ROUTZAHN, OF SAME PLACE.

MECHANICAL MOVEMENT.

SPECIFICATION forming part of Letters Patent No. 539,847, dated May 28, 1895.

Application filed February 2, 1895. Serial No. 537,101. (No model.)

*To all whom it may concern:*

Be it known that I, ALVIN N. WOODARD, a citizen of the United States, residing at Mansfield, in the county of Richland and State of Ohio, have invented a certain new and useful Improvement in Mechanical Movements, of which the following is a full, clear, and exact description.

This invention relates to mechanical movements wherein a weight is used as the motive force, and the main object of the invention is to provide for the full utilization of the weight for application of power to the movement of a train of gearing, or other converting and transmitting mechanism.

Another object of the invention is to provide for the raising of the weight after it has spent its power; the raising of the weight, and the fact that it has spent its power, not affecting the running of the machine under the momentum acquired in the descent of the weight.

In the embodiment of my invention which I have selected for illustration in this case, I have used a train of gearing comprising a main shaft having a sprocket wheel loose on said shaft and clutched with the shaft to rotate it under the power of the descending weight, and to run free of said shaft when it is reversed to effect the raising of the weight or rewinding or resetting of the movement; and on the shaft is fixed a gear wheel which meshes with a pinion on a counter-shaft, from which counter-shaft the power is taken to any object that is to be operated. On the main shaft is a rewinding or resetting mechanism, comprising a drum and a clutch mechanism connected with the drum, from which drum a flexible connector passes to a traveling pulley, which has an internal gear, within which is arranged a shifting pinion, from which is suspended the weight; and this weight and the traveling pulley are connected with the sprocket on the main shaft by means of a sprocket chain, in such manner that the descent of the weight will rotate the said sprocket wheel and through it the shaft, to set the movement in operation for transmitting power; the reverse movement of the flexible connector, under the action of the rewinding mechanism serving to raise the pulley and the weight, without affecting the momentum of the transmitting gearing, all as I will proceed now more particularly to set forth and finally claim.

In the accompanying drawings, illustrating my invention, in the several figures of which like parts are similarly designated, Figure 1 is a side elevation looking at the rewinding side of the machine. Fig. 2 is an end elevation looking from the left of Fig. 1. Fig. 3 is a front elevation of part of the rewinding mechanism in detail. Fig. 4 is a top plan view of the same. Fig. 5 is a vertical sectional elevation of the main shaft and its applied parts, and Fig. 6 is a sectional elevation of the traveling pulley and its appurtenances.

1 may represent a floor or platform or counter, or other support for the machine, the space beneath which may be utilized for a portion of the machine.

2 is the base or bed-frame of the machine which may be supported upon A-frames or other supports 3. Upon the sides of the frame 2 are erected A-frames 4, and these A-frames 4 are provided with boxes or bearings 5, in which the main shaft 6 is arranged; and as shown in Fig. 5, I prefer to employ rollers 7 in these bearings in order to reduce friction to a minimum.

8 is the main gear wheel, which is made fast to the shaft 6, and is provided with a recessed hub 9. Next to this gear wheel is arranged the sprocket wheel 10, friction rollers 11 being arranged in the hub of the said sprocket wheel and adjacent to the shaft for anti-friction purposes. The hub of the sprocket wheel 10 is extended laterally at 12 to enter the socketed hub 9 of the gear wheel 8; and said extension 12 of such sprocket wheel is provided with a roller clutch 13 of any approved construction, whereby the said sprocket wheel 10 is made to engage with the hub of the gear wheel 8 to rotate the shaft, when the said sprocket wheel is turned in one direction, and to run free of the shaft and said gear wheel when the said sprocket wheel is turned in the opposite direction. Any suitable clutch mechanism having this capacity may be substituted for that shown, although I prefer for sake of simplicity and economy to employ that described specifically. 14 is a washer interposed between the hub of the sprocket wheel and the bearing 5, and so, also, the washer 15 may be interposed between the hub of the gear wheel 8 and its adjacent bearing 5. The gear wheel 8 meshes with a pinion 16 made fast to a counter-shaft 17, which is arranged in bearings 18 on the frame 2; and on the outer end of the shaft 17 is arranged a sprocket wheel 19, or a crank or any other device, by means of which the rotary motion imparted to the shaft 17 may be utilized.

20 is a grooved drum, herein shown as mounted loosely upon the main shaft 6, outside of its bearings and having interposed friction rollers 21, so as to provide for the free rotation of the said pulley upon the said shaft in both directions. This pulley is provided with a laterally extended smooth-surfaced flange 22, which may be engaged by any suitable grip mechanism for the purpose of positively rotating the said pulley in the given direction. One such mechanism is herein illustrated, but while I have so illustrated such mechanism as a part of my invention, I wish to be understood as not limiting my invention to it, inasmuch as it may be replaced by any suitable mechanism for positively rotating the grooved drum.

Loosely fulcrumed on the shaft 6 is a toothed sector 23, which has a depending arm 24, in which is pivoted the grip 25 whose motion is limited in one direction by the stop 26, and this grip engages periodically the flange 22 of the drum. A second and complemental toothed sector 27 is pivoted on a stud 28 on an arm or bracket 29, extending from one of the A-frames 4, and is in mesh with the toothed sector 23. The arm 30 of sector 27 receives an operating handle 31, by which a vibratory movement may be given to the sector 27 and transmitted to the sector 23, to move the grip 25 periodically to engage the flange 22 to rotate the drum 20. The arm 30 of sector 27 has pivoted to it a swinging bar 32, in which is a pivoted grip or clutch mechanism 33 of similar character to that of the grip 25 and similarly engaging another portion of the flange 22. To facilitate the action of the grips or clutches on the flange 22, the inner surface of said flange may be serrated or roughened, as shown in Figs. 1 and 3. It will be observed that in the movement of these sectors, one of the clutch or grip mechanisms will be engaging and pulling upon the flange 22 in order to rotate the drum, while the other is being carried into position to get a fresh hold on said flange, and thereupon, in the reverse movement of the sectors, this last-named clutch mechanism will engage the flange and continue the rotation of the drum in the same direction, while the first-named clutch mechanism is being carried into position for a fresh hold on the next reversal of the sectors. Now, it will be observed that this drum clutching or gripping mechanism is provided to rotate the drum positively in one direction, and to leave the drum free to rotate independently thereof in the other direction. To this drum 20 is affixed one end of the flexible connector 34, herein shown as a chain, and this chain is passed about the drum one or more times and descends thence around the traveling pulley 35, and its other end 36 is made fast to the support 1, or other fixture, so that the pulley 35 is suspended in a loop, which, during the operation of the machine, is elongated or enlarged, and contracted or shortened, thereby to lower and raise the said pulley relatively to the support 1.

It will be understood now that the described movements of the drum 20 are for the purpose of permitting the lowering of the pulley and for effecting positively the lifting of the pulley. This pulley 35 is made in the form of a ring, see Figs. 2 and 6, and the interior surface of the said ring is made with a central row of cogs or spurs 37, on opposite sides of which are the plain surfaces or tracks 38; and arranged eccentrically and loosely within this pulley is a pinion 39, having complemental teeth to engage these cogs or spurs 37 of the pulley and complemental plain surfaces or rims 40 to run on the plain surfaces or tracks 38 of the pulley; the provision of the plain surfaces 38 and 40 affording guidance for the movements of the pinion and serving to steady it in such movements.

I have found that in using a traveling pinion within an internal gear, if the points of the teeth of the pinion are allowed to go to the roots of the teeth of the internal gear, there is excessive friction which, in a measure at least, interferes with the efficiency and freedom of movement of the parts, and in order to overcome this defect, I make the parts 38 and 40 of such relative height that while they allow the teeth of the pinion and of the internal gear to take free hold of one another, they also raise the teeth of the pinion sufficiently far from the roots of the internal gear to permit the pinion to run freely within the internal gear. This pinion 39 is arranged to turn with its shaft or spindle 41 in bearings in a strap 42 which incloses the sides of the pulley. This strap 42 is engaged at its upper end by a sprocket chain 43 which depends from the sprocket wheel 10 hereinbefore described, and the other end of the said sprocket chain 43 is connected with a motor weight 44 which hangs from the lower end of the strap 42.

In Fig. 1, the chain 34 is shown as broken away in order to expose the chain 43 behind it; and in this illustration the chain 43 is connected directly with the top of the strap 42 at one end, and at its other end is connected with the bottom of the weight 44; while in Fig. 6, the chain 43 is shown as an endless chain connected laterally with the strap and weight. Either of these forms of connection, or others, may be used as desired.

The operation is as follows: The parts being assembled substantially as represented in the drawings, and as hereinbefore described, the drum 20 is rotated so as to contract the loop of flexible connector or chain and draw up the pulley and its suspended weight to the limit of its height, and the machine thus being set for use, the drum is freed from its rewinding mechanism and the motor weight left free to descend. As it descends, it draws upon the sprocket chain, and the sprocket chain rotates the sprocket, which, clutching with the gear wheel 8, rotates the main shaft and the counter-shaft, whence the power is taken. When the motor weight has reached the limit of its descent, the machine may run to exhaust its momentum, entirely free of the sprocket wheel, the sprocket wheel itself coming to a dead standstill, and thereby releasing its clutch on the hub of the gear wheel 8. As the motor weight descends and drags upon the pinion, inasmuch as the pulley itself is being rotated in the enlarging or elongating loop of chain 35, there is a tendency of the pinion to shift its center of motion, or, in other words, to climb up the internal gear of the pulley and thereby draw upon said pulley and increase the speed as well as augment the power of the machine; and the full efficiency of this action is utilized by virtue of the fact that the friction of the intermeshing teeth of the pinion and the internal gear is reduced to a minimum by virtue of the elevating ways or tracks 38. In rewinding or resetting, the loop of chain 35 is being contracted or shortened and the center of motion of the pinion is shifted to the opposite side of the pinion, so that said pinion tends to travel up the opposite side of the pulley, thereby assisting the rotation or drag of the pulley upon the chain and to that extent and in that manner easing the lifting of the motor weight.

In my application, Serial No. 531,891, filed December 15, 1894, I have shown a mechanical movement embodying the principle of this invention in so far as concerns a rotary pulley containing an internal gear and a traveling pinion therein from which a weight is suspended, the rotary pulley being arranged within an elongating and contracting loop, and so far as that portion of the invention is concerned, this present invention is an improvement thereupon.

What I claim is—

1. A mechanical movement, comprising a flexible connector or chain, made fast at one end and applied to a rotatable body at the other end, a combined internal gear and pulley arranged in a loop in the said chain, a pinion arranged within the said combined internal gear and pulley, the said internal gear and pinion having laterally disposed tracks to modify the extent of engagement of their respective teeth, and a motor weight suspended from said pinion, substantially as and for the purpose described.

2. A mechanical movement, comprising a flexible connector or chain, made fast at one end to a fixed body, a main shaft, a drum loose on said main shaft and about which the other end of the said chain is wound and to which it is made fast, and depending from said drum in the form of a loop, a combined internal gear and pulley suspended in the loop of said chain, a pinion arranged within said combined internal gear and pulley, a weight suspended from said pinion, a sprocket wheel loose on the said shaft, a sprocket chain arranged upon said sprocket wheel and connected at opposite ends, in any suitable manner, with the combined internal gear and pulley, so as to receive the effect of the motor weight, a gear wheel fast on the said main shaft, a clutch interposed between the said gear wheel and the sprocket wheel, and suitable means to take the rotary motion from the said gear wheel imparted thereto by the descent of the weight acting upon the sprocket wheel through the sprocket chain, substantially as described.

3. A mechanical movement, comprising a flexible connector or chain made fast at one end to a fixed body, a main shaft, a drum loose on said main shaft and about which the other end of the said chain is wound and to which it is made fast, and depending from said drum in the form of a loop, a combined internal gear and pulley suspended in the loop of said chain, a pinion arranged within said combined internal gear and pulley, a weight suspended from said pinion, a sprocket wheel loose on the said shaft, a sprocket chain arranged upon said sprocket wheel and connected at opposite ends, in any suitable manner, with the combined internal gear and pulley, so as to receive the effect of the motor weight, a gear wheel fast on the said main shaft, a clutch interposed between the said gear wheel and the sprocket wheel, and suitable means to take the rotary motion from the said gear wheel imparted thereto by the descent of the weight acting upon the sprocket wheel through the sprocket chain, combined with means for rewinding the drum, substantially as described.

4. A mechanical movement, comprising a flexible connector or chain, made fast at one end to a fixed body, a main shaft, a drum loose on said main shaft and about which the other end of the said chain is wound and to which it is made fast, and depending from said drum in the form of a loop, a combined internal gear and pulley suspended in the loop of said chain, a pinion arranged within said combined internal gear and pulley, a weight suspended from said pinion, a sprocket wheel loose on the said shaft, a sprocket chain arranged upon said sprocket wheel and connected at opposite ends, in any suitable manner, with the combined internal gear and pulley, so as to receive the effect of the motor weight, a gear wheel fast on the said main shaft, a clutch interposed between the said gear wheel and the sprocket wheel, and suitable means to take the rotary motion from the said gear wheel imparted thereto by the descent of the weight acting upon the sprocket wheel through the sprocket chain, combined with means for re-winding or resetting the drum, consisting essentially of two intermeshing toothed sectors, and gripping devices connected therewith and operated thereby and acting upon the drum alternately, substantially as described.

In testimony whereof I have hereunto set my hand this 25th day of January, A. D. 1895.

ALVIN N. WOODARD.

Witnesses:
WM. H. FINCKEL,
HARRY Y. DAVIS.